United States Patent [19]
Coellner et al.

[11] Patent Number: 5,749,230
[45] Date of Patent: May 12, 1998

[54] METHOD FOR CREATING A HUMIDITY GRADIENT WITHIN AN AIR CONDITIONED ZONE

[75] Inventors: James A. Coellner, Philadelphia, Pa.; Dean Scott Calton, Vincenttown, N.J.

[73] Assignee: Engelhard/ICC, Hatboro, Pa.

[21] Appl. No.: 642,990

[22] Filed: Jan. 18, 1991

[51] Int. Cl.$^6$ ............................................. F25D 17/06
[52] U.S. Cl. .............................. 62/94; 62/304; 62/271
[58] Field of Search .................................. 62/93, 92, 91, 62/94, 271; 55/35, 267, 268; 34/80, 81; 96/117, 125, 126; 95/288, 289

[56] References Cited

U.S. PATENT DOCUMENTS

| | | | |
|---|---|---|---|
| 2,792,071 | 5/1957 | Pennington | 62/94 |
| 3,125,157 | 3/1964 | Munters et al. | |
| 4,594,860 | 6/1986 | Coellner et al. | |
| 4,819,444 | 4/1989 | Meckler | |
| 4,887,438 | 12/1989 | Meckler | |
| 4,905,479 | 3/1990 | Wilkinson | |
| 4,955,205 | 9/1990 | Wilkinson | |
| 4,987,750 | 1/1991 | Meckler | |
| 5,148,374 | 9/1992 | Coellner | |
| 5,170,633 | 12/1992 | Kaplan | 62/97 |

OTHER PUBLICATIONS

Modified HEB Store, Texas (1988) as described in the Information Disclosure Statement filed on Jun. 23, 1997 in U.S. Patent Application Serial No. 07/642,990.

Photocopy of brochure: Cargocaire, Munters Group, Super-Add, "The Simple Solution to Supermarket Humidity Problems" 688/2M, dated Jun. of 1988.

HEB Store (#16), San Antonio, Texas (1983) as described in the Information Disclosure Statement filed on Oct. 10, 1996 in U.S. Patent Application Serial No. 07/642,990.

HEB Store Nos. 9 and 15, Corpus Christie, Texas (1988) as described in the Information Disclosure Statement filed on Oct. 10, 1996 in U.S. Patent Application Serial No. 07/642,990.

Modified KMart HEB Store, Texas (1988) as described in the Information Disclosure Statement filed on Oct. 10, 1996 in U.S. Patent Application Serial No. 07/642,990..

The DESI/GEN system as it existed and was used from Jun. of 1989 to Jan. 17, 1990 by icc Technologies, Inc. as described in the Information Disclosure Statement (including Exhibits A–CC) filed on Oct. 10, 1996 in U.S. Patent Application Serial No. 07/642,990. (listed but not admitted as prior art).

Photocopy of EPRI brochure entitled "Supermarket Air Conditioning and Dehumidification", cover sheet, second sheet, pp. marked 1–8, and 4 additional pages (undated, but admitted prior art).

*Primary Examiner*—John M. Sollecito
*Attorney, Agent, or Firm*—Panitch Schwarze Jacobs & Nadel, P.C.

[57] ABSTRACT

A method for modulating humidity across large single-zone air conditioned spaces such as those typically found in supermarkets wherein conventional air conditioning means and a desiccant unit are combined to supply varying levels of humidity to different regions within the single-zone space.

18 Claims, 4 Drawing Sheets

METHOD FOR CREATING A HUMIDITY GRADIENT WITHIN AN AIR CONDITIONED ZONE

BACKGROUND OF THE INVENTION

This invention relates to a method and apparatus for establishing humidity gradients within a single-zone air conditioned space. More particularly, the present invention relates to a method and apparatus for modulating humidity across large single-zone air conditioned spaces such as those typically found in supermarkets.

Supermarkets are highly intensive energy operations. Energy cost represents a significant share of overall operating cost, often equalling a store's annual profit. The largest share of supermarket energy cost is for refrigeration. Display cases refrigerated 24 hours a day typically account for more than half the electricity used in the store. Excess humidity causes the refrigeration system to consume more energy. Optimum dehumidification can help the efficiency of the refrigeration system and reduce the associated energy cost. In most commercial HVAC applications, the primary function of an air conditioning system is temperature control. In supermarkets, however, the emphasis is on dehumidification, because reducing the amount of moisture in the air causes the refrigeration system to operate more efficiently.

Once a lower humidity level is achieved in the supermarket, a number of operational benefits are simultaneously achieved. First, the energy expended by the refrigeration cases in removing moisture from the air is reduced. Second, the buildup of frost on the refrigeration coils is reduced, thereby reducing the insulating effect of frost on the coils and allowing the coils to be defrosted less frequently. Third, the need for anti-sweat heating of display case doors and other surfaces is reduced. In addition to reduced energy use for the anti-sweat heaters themselves, the load on the refrigerating coil is also reduced because less heat is transferred from the anti-sweat heaters into the display case.

An air conditioning zone is a space enclosed or separated from other spaces or environments. Traditionally, air conditioned zones are bounded by fixed walls or other physical separations. Such zones may also be bounded by flexible membrane barriers or high velocity streams of air known as "air curtains." System designers have heretofore recognized that temperature gradients, caused by internal heat generating sources such as lights, electrical equipment or refrigeration devices, may develop within such zones. Typically, the refrigeration cases in a supermarket are located some distance from the fresh produce section of the sales area. The ambient temperature in the area immediately surrounding the refrigeration cases is usually lower than the temperature in the other areas of the store and is often below a customer's comfort level. In the remainder of the store, temperature levels are generally acceptable, with the exception of the checkout area. Temperatures rise in the checkout area because windows, entryways, and concentrations of customers and employees are typically located there. It is also generally recognized that temperature gradients may result from vertical stratification of warmer air. To counteract these gradients and achieve temperature uniformity, return ducts located near the heat generating source and air circulation equipment such as ceiling fans are typically employed.

In contrast to temperature gradients, it is generally believed that significant humidity gradients do not and can not exist within a single zone. This belief rests in part on the rate with which moisture diffusion is thought to occur within such zones. As a result of this belief, the space conditioning control strategy recommended in professional literature specifies that large single zones such as supermarkets should be treated as a single entity, wherein fixed set points for temperature and humidity are maintained throughout the space. These set points are almost uniformly specified as 75° F. dry bulb temperature and 55% relative humidity. The operating condition defined by these set points is so well accepted by design and operating personnel in the supermarket industry that all equipment designed for the conditioned space (sales area) is rated at that operating condition. In fact, capacity and power consumption values for refrigerated cases are not published for other operating conditions. Moreover, since conventional air conditioning systems are intended primarily for temperature control, they produce relative humidities approximating the 55% level typically employed in supermarket applications. Such systems are not designed to produce lower humidity levels.

Because of the increased cost of electric power and the concern for the availability of electric power in the future, system designers and engineers have investigated the advantages of other set points. In applications such as supermarkets, wherein refrigeration cases are located within the conditioned space, significant power savings can be realized from the operation of the refrigeration cases if the ambient humidity is lessened to 30%. As explained above, this power savings results from, inter alia, the fact that it takes a refrigeration case less energy to cool dryer air. the latent load of such air having been reduced by the lower ambient humidity. Unfortunately, in the supermarket application, a lower overall humidity level within the conditioned space is unacceptable, because lower humidity levels have an adverse effect on fresh produce. Where the humidity is too low, vegetables begin wilt—requiring spraying, which acts to raise the humidity again. This condition forces system designers to opt for an overall ambient humidity level of 55%—which is not optimal for the operation of the refrigeration cases.

When conventional electric systems have been employed to control humidity in supermarkets, their performance has been less than satisfactory. When the system is operated long enough to achieve the desired 55% relative humidity level, the air in some or all of the store often becomes too cool, thus requiring heating to achieve a comfortable ambient temperature level. Several technologies, including gas fired desiccant systems and high-efficiency air conditioning systems, have been adapted and developed to help supermarket owners efficiently achieve the desired 55% relative humidity level.

Gas fired desiccant systems, which were originally developed for sensitive product shipping and warehousing applications, remove moisture from the air to achieve a lower humidity level. In recent years, this technology has been combined with conventional electric air conditioning systems for use in supermarkets. In such systems, the desiccant system first acts to dehumidify return air from the zone. Since the desiccant system also works to warm air passing through, this added heat must next be removed by electric air conditioning before the air can be passed back into the zone. The heat added by the desiccant equipment represents an additional load for the electric air conditioning system in addition to the space cooling load.

High efficiency electric air conditioning technologies cool return air to lower temperatures—approximately 40° to 45° F.—in order to remove moisture. In these systems, only a percentage of the return is cooled. More particularly, enough of the return air is cooled to achieve the required low humidity level. The remainder of the return air is allowed to bypass the cooling coil, thereby minimizing overcooling and the need to reheat the conditioned air for its return to the store.

Different air flow techniques have also been employed in connection with these new technologies to further improve system performance. In a supermarket, much of the air returning the air conditioning system from within the store may already be cool as well as low in humidity. For example, to avoid uncomfortably cold aisles, the cold, dry air escaping from refrigeration display cases is typically captured by returns under the cases and returned to the air conditioning unit. In comparison with outside air, air returned from elsewhere in the store is also relatively cool and dry. Although such air does not require significant processing, conventional air conditioning systems channel it through the cooling and dehumidification process just as if it were warm and humid air taken from outside the store.

Modern airflow techniques address these inefficiencies by channelling return air so as to bypass the cooling and dehumidification units. One such channelling technique—known as a single path system—is shown in FIG. 1.

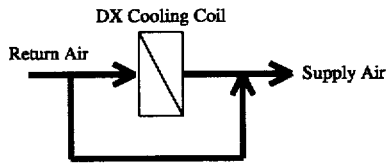

In such a system, the cooling unit can be sized for the smaller volume of air which will actually pass through the unit. After that air is cooled to the low temperature needed to reach the desired humidity, it is mixed with the bypassed air. This blend is typically cooler than the conditioned air normally delivered by conventional air conditioning systems, so less of it is needed to achieved the desired store temperature (75° F.) and humidity (55%).

An alternative air channelling technique—known as dual path channelling—is shown in FIG. 2.

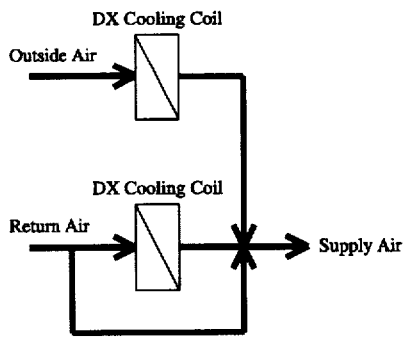

In the dual path system, the air is processed in two separate streams, with the outdoor air directed to a primary coil and the relatively cool and dry return air being cooled by a secondary coil only when necessary. Both the single and dual path systems allow system designers to employ smaller cooling units and circulation fans, thereby effecting significant energy savings. Other system enhancements which have been added to improve performance in the supermarket industry include heat pipe exchange and ice storage systems.

All of the above techniques share the common goal of maintaining a uniform temperature (75° F.) and humidity (55%) throughout the air conditioned zone. Although significant energy savings could result if the ambient humidity in the area around the refrigeration cases was lowered to 45%, no system to date has attempted to capitalize on this fact because an overall lower humidity level throughout the store is undesirable for certain goods such as fresh produce.

SUMMARY OF THE INVENTION

By creating a humidity gradient across a conditioned space, the present invention achieves varied humidity levels within a single conditioned zone. In the supermarket application, this gradient places less humid air in the area surrounding the refrigeration cases. The humidity level in the zone increases as one moves away from the refrigeration cases and towards the fresh produce or other sections. This operating condition results in significant power savings in the operation of the refrigeration cases, while maintaining a humidity level in the fresh produce section which is acceptable for the storing of such goods. In addition, the present invention works to reduce the overall level of air circulation within the zone, thereby reducing the power typically consumed by the air circulation fans.

DETAILED DESCRIPTION OF THE INVENTION

In applying the present invention to an existing supermarket, the existing air conditioning equipment can be retained, however, the supply and return ducts to the area of the refrigeration cases should be disconnected from the existing equipment. A desiccant dehumidification unit, such as that described in Munters, U.S. Pat. No. 3,125,157 should then be installed to supply the area of the refrigeration cases. The disclosure of Munters is incorporated herein by reference.

The desiccant unit supplies dry air to the area of the refrigeration cases, thereby improving the energy efficiency of the refrigeration cases. The dry air supplied by the desiccant unit is also warmer than the return air, thereby increasing the temperature and customer comfort level within the area of the refrigeration cases. When the desiccant system is used as described in the present invention, a temperature set point of 75° F. can be achieved in both the refrigerated and non-refrigerated areas of the conditioned zone. In addition, a humidity set point of 30% relative humidity can be achieved in the refrigerated area, while a 55% relative humidity is maintained in other areas of the zone or store.

Figure 1:
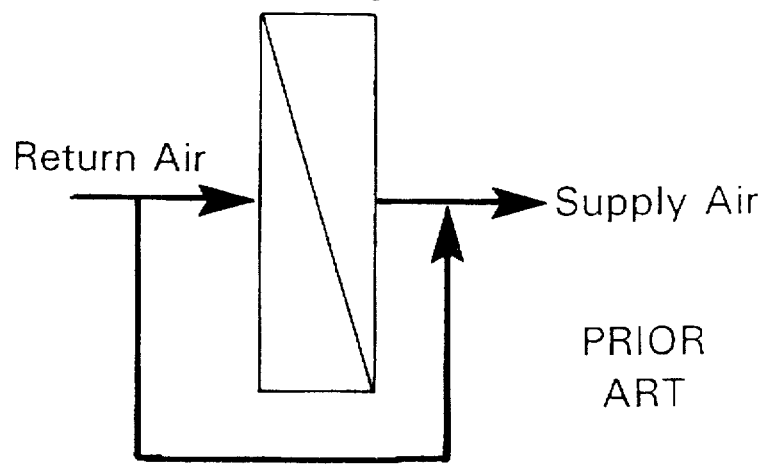
FIG. 1 is a schematic of a conventional air conditioning unit showing a return air channeling technique.
Figure 2:
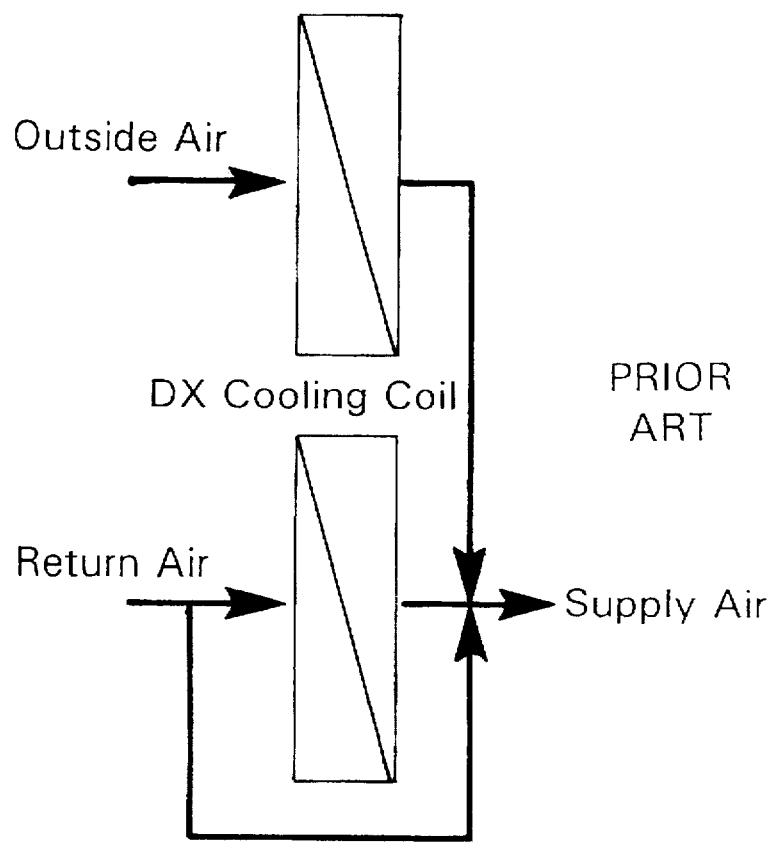
FIG. 2 is a schematic of a second conventional air conditioning unit which uses dual path channeling.
Figure 3:
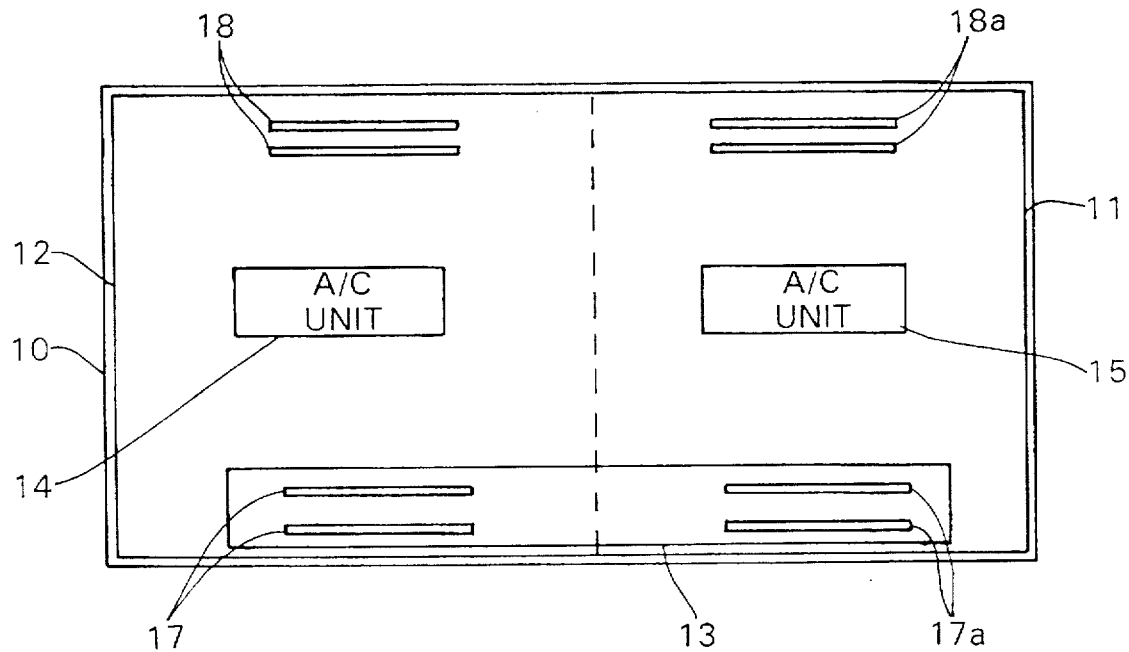
FIG. 3 shows the layout of a supermarket of the prior art.

Referring now to the figures, FIG. 3 shows the layout and load distribution of a typical supermarket of the prior art.

Produce is typically located in area 11 and refrigeration cases are typically found in area 12, so as to be positioned on opposite ends of zone 10. Checkout area 13 is located in the front of zone 10. The load of zone 10 is distributed between air conditioning units 14 and 15. Supply air is injected into the front of zone 10 (checkout area 13) through supply ducts 17 and 17a, and return air is withdrawn from the back of zone 10 by return ducts 18 and 18a, thereby creating an air flow directed from the front to the back of zone 10. Unit 14 is typically connected to ducts 17 and 18, and unit 15 to ducts 17a and 18a. Alternatively, units 14 and 15 may share common supply and return paths. In a 20,000 square foot store, units 14 and 15 would each typically be a 40 ton unit having the capacity to move 24,000 CFM of air.

Figure 4:
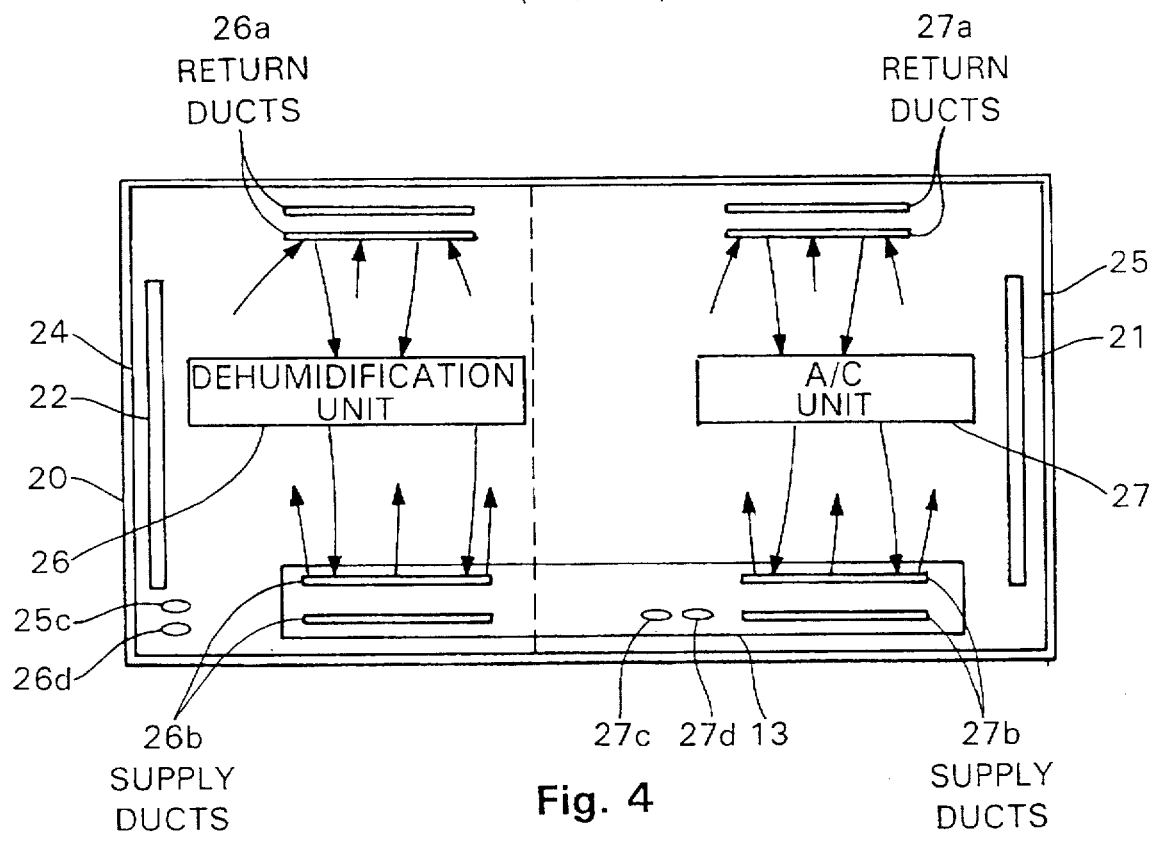
FIG. 4 shows the layout of a supermarket arranged according to the present invention.
Figure 5:
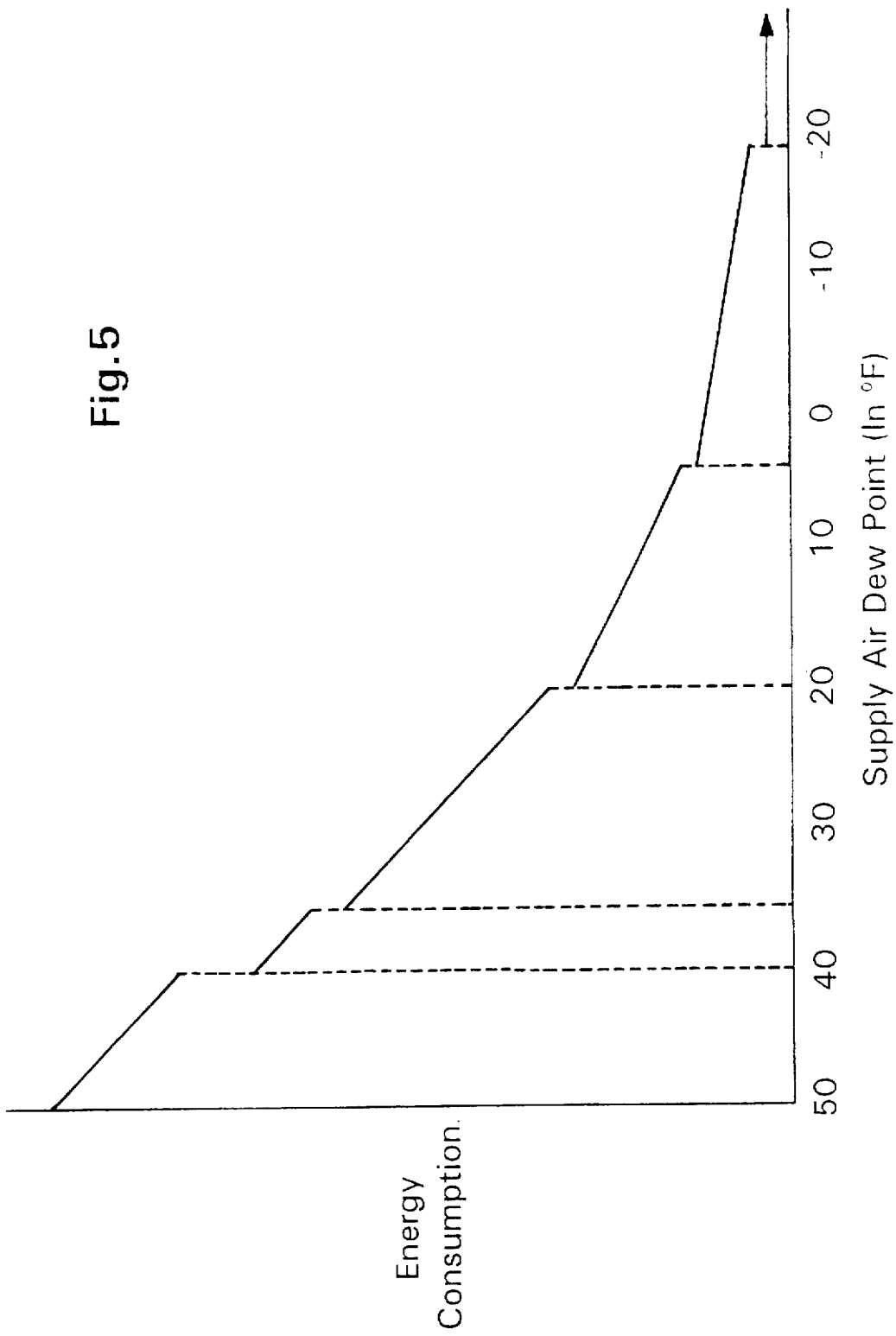
FIG. 5 is an energy consumption chart for refrigeration cases based on the supply air dew point.

FIG. 4 shows the layout and load distribution of a supermarket designed in accordance with the present invention. Produce area 21 and refrigeration area 22 are located on opposite ends of zone 20, and checkout area 13 is located in the front of zone 20. The layout of the zone 20 is divided into a refrigeration space 24 and a non-refrigeration space 25. The load of zone 20 is distributed between desiccant unit 26 and air conditioning unit 27. Desiccant unit 26 draws its return air from and injects its supply air into refrigeration space 24; air conditioning unit 27 draws its return air from and injects its supply air into non-refrigerated space 25. Units 26 and 27 are connected to their respective spaces through conventional return and supply ducts located within the respective zones. More specifically, desiccant unit 26 draws return air from ducts 26a, and injects supply air through ducts 26b. Similarly, air conditioning unit 27 draws return air from ducts 27a, and injects supply air through ducts 27b.

Supply ducts 26b can descend from the ceiling in the center of a shopping aisle and, in aisles containing open (or coffin) refrigeration cases, these ducts will preferably direct the supply air parallel to the direction of the shopping aisle. In aisles containing closed door refrigeration cases, the supply air is preferably directed at the cases (or perpendicular to the direction of the aisle). Desiccant unit 26 is controlled by thermostat 26c and humidistat 26d, while air conditioning unit 27 is controlled by thermostat 27c and humidistat 27d. Both thermostats will typically be set at 75° F., humidistat 26d can then be set to achieve a 45% relative humidity (or lower) in refrigeration space 24, and humidistat 27d can be set to achieve a 55% relative humidity in non-refrigerated space 25. A Honeywell model T42 thermostat, or any other suitable model, can be used for thermostats 26c and 27c, and a Honeywell model H609A dew-point controller, or any other suitable model, can be used for humidistats 26d and 27d.

When the arrangement shown in FIG. 4 was applied to a supermarket with a sales area of approximately 20,000 square feet, wherein desiccant unit 26 was rated at 150 lbs./hour having the capacity to move 8,000 CFM of air, and air conditioning unit 27 was a 40 ton unit having the capacity to move 24,000 CEF of air, a 75° F. temperature level was generally created throughout the zone and a humidity gradient ranging from 45% to 55% relative humidity was targeted and achieved across zone 20. Dew points as low as −20° F. were also achieved in air supplied by desiccant unit 26. In addition, the energy needed for air circulation within the zone was substantially reduced.

Because the system of the present invention is capable of delivering supply air with dew points of from 40° F. to −20° F. and below, the system may be controlled to optimize the cost-efficiency of operation. Typically, heat used in regeneration of a desiccant wheel is derived from one or more of three sources: air conditioning condenser strip heat, desiccant wheel waste heat (transferred through a counter-flowing heat exchange medium such as a heat exchanger wheel), and supplementary heat derived from gas combustion or electrical resistance. The marginal energy cost of supplying air having less moisture content is the sum of all of the energy used over and above the available heat derived from normal operation of the HVAC systems.

The system of the present invention may be optimally controlled by calculating the marginal energy cost required to achieve a preselected level of dehumidification, and comparing that marginal cost against the calculated savings to be derived from lowering the moisture content of the supply air. For example, it is known that for every 1° F. reduction in dew point, a 1% reduction in energy consumption of refrigeration equipment (air conditioners, freezer cases, refrigerated cases, and the like) is achieved. This relationship holds true down to dew points near the refrigerant temperature of a given piece of refrigeration equipment.

Similarly, glass-front refrigerated cases typically use resistive heaters in their doors to prevent condensation. Such heaters (anti-sweat heaters) are activated when the surrounding air is above approximately 40° F. dew point, and each door heater typically consumes 250 W of electrical energy. In addition, each heater reflects approximately 200 W of additional load into the refrigerated case, for a total load of approximately 0.5 KW per door. The energy savings which may be realized by deactivation of the door heaters stands in addition to the linear energy savings (1° F. reduction in dew point=1% reduction in energy consumption) which holds for refrigeration equipment described above.

Other points of criticality may be factored into the dew point optimization calculation. For example, when the ambient dew point passes below the surface temperature of goods stored in open refrigerated cases, elimination of surface condensation on the goods is achieved, thereby reducing the latent (and therefore overall) load on the refrigeration system. Typically, supermarkets have separate open refrigeration cases for both medium temperature and frozen goods. In the 75° F. environment of most supermarkets, condensation is eliminated in the medium temperature cases when the dew point passes below 36° F., and in the frozen cases when the dew point passes below 5° F.

In addition, as the dew point is reduced towards the surface temperature of the cooling coils in the refrigeration cases, icing on the coils is reduced thereby reducing the frequency with which defrost cycles must be undertaken. In fact, in medium temperature cases the need for defrosting is totally eliminated when the dew point passes below 20° F., and the need for defrosting in frozen cases is eliminated below a dew point of −20° F. Since defrost cycling consumes energy, significant energy savings can be achieved by eliminating or reducing the need for defrosting. Moreover, since defrost cycles typically have a negative effect of many refrigerated goods, i.e. water contained in ice cream typically crystalizes as a result of defrost cycling, a lower ambient dew point may have the corollary benefit of improving shelf life. A graphical illustration of the overall energy consumed by the refrigeration cases versus ambient dew point is shown below:

As shown above, while some of the energy savings available are threshold events (such as deactivation of door heaters), others are both threshold and proportional (such as lengthening the interval between defrost cycles, and the complete elimination of the need for such cycles), and others are strictly proportional (such as the increase in cooling efficiency of air conditioners with decreasing moisture content of the air to be cooled). Thus, for any predetermined adjustment in ambient air dew point, the cost to achieve the target dew point must be measured against the savings from the sum of these effects.

Figure 6:
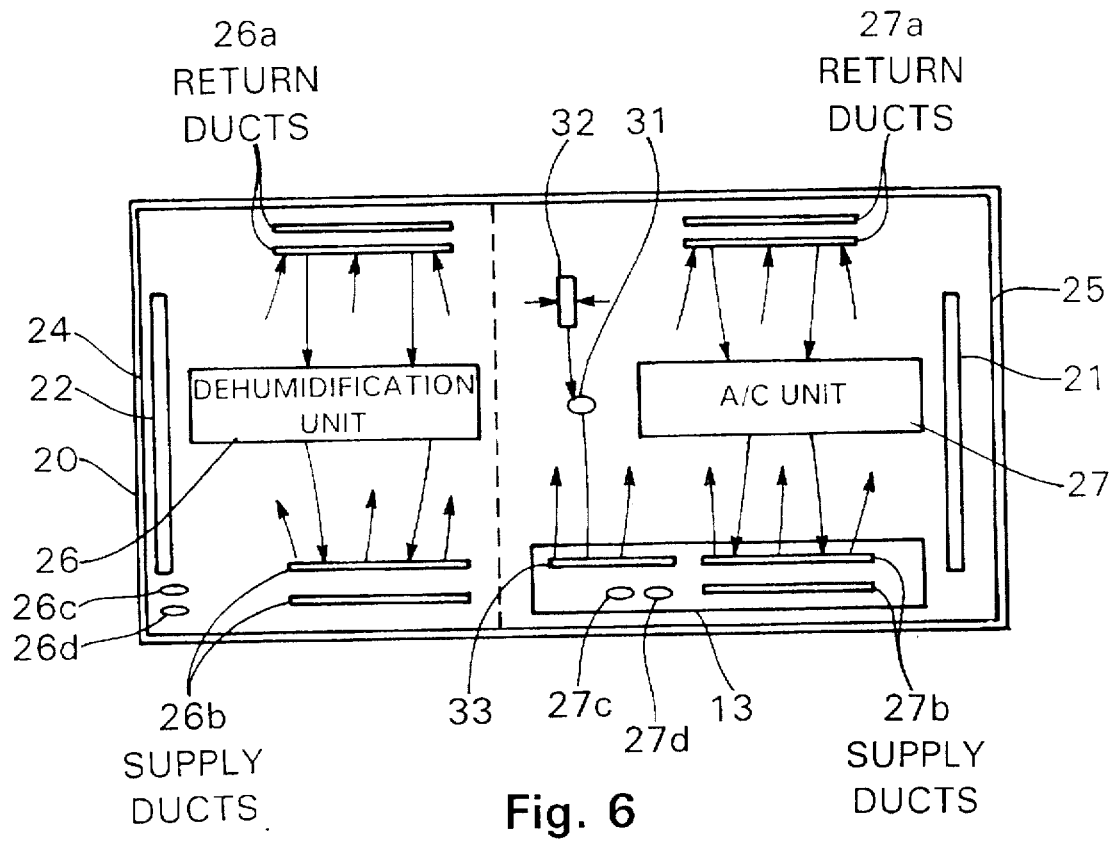
FIG. 6 shows the layout of a supermarket arranged according to an alternate embodiment of the present invention.

FIG. 6 shows the layout of a supermarket arranged according to an alternate embodiment of the present invention. In this arrangement, checkout area 13 is located in the front of the zone, however, it does not extend into the refrigeration space 24. In this embodiment, cool air from other parts of non-refrigeration space 25 is redistributed within that space to checkout area 13. This redistribution may be accomplished through conventional duct work or other known means. In the embodiment shown, this redistribution is accomplished by redistribution fan 31, which acts to withdraw cool air through duct 32 and inject it back into non-refrigerated space 25 through duct 33. This embodiment is designed to counteract the higher temperature levels which typically occur within the checkout area.

Figure 7:
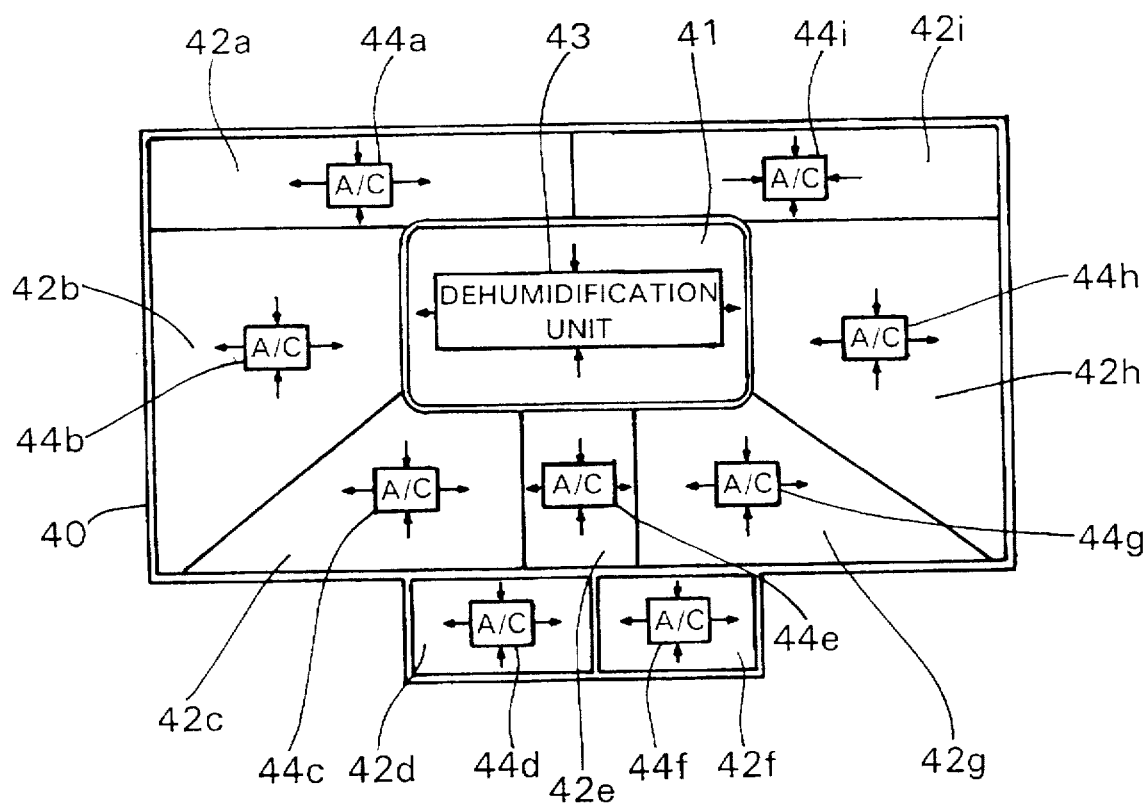
FIG. 7 shows a further alternative supermarket layout arranged according to the present invention.

Referring now to FIG. 7, there is shown a further alternative supermarket layout arranged according to the present invention. In this embodiment, refrigeration space 41 is located within the center of zone 40, with non-refrigeration space 42 surrounding refrigeration space 41. Non-refrigeration space 42 is subdivided into non-refrigerated regions 42a, 42b, 42c, 42d, 42e, 42f, 42g, 42h and 42i. In a typical supermarket, subregions 42a and 42b might contain produce, subregions 42c, 42d, 42e, 42f and 42g might represent the checkout and vestibule areas, and subregions 42h and 42i might contain general merchandise. Refrigeration space 41 is serviced by desiccant unit 43. Non-refrigeration space 42 is serviced by individual air conditioning units 44a, 44b, 44c, 44d, 44e, 44f, 44g, 44h and 44i, located within corresponding subregions 42a, 42b, 42c, 42d, 42e, 42f, 42g, 42h and 42i. Desiccant unit 43 and air conditioning units 44a–i are each controlled by a conventional thermostat and humidistat. Each of the air conditioning units have return and supply ducts (not shown) which connect the intake and output of each air conditioning unit to its respective zone.

When the arrangement shown in FIG. 7 was applied to a supermarket with a sales area of approximately 20,000 square feet, wherein desiccant unit 43 was rated at 150 lbs./hour having the capacity to move 8,000 CFM of air, and air conditioning units 44a–i were each 8 ton units having the capacity to move 4,400 CFM of air, a 75° F. temperature level was generally created throughout the zone. Moreover, a relative humidity of 45% was achieved in refrigeration space 41, while non-refrigerated space 42 remained generally at a 55% relative humidity. In this embodiment, the energy needed for air circulation within the zone was again substantially reduced. Moreover, given the smaller decentralized air conditioning units employed in non-refrigeration space 42, substantially less duct work was required for this system, thereby reducing its up-front cost.

The present invention may be embodied in other specific forms without departing from the spirit or essential attributes of the invention. Accordingly, reference should be made to the appended claims, rather than to the foregoing specification, as indicating the scope of the invention.

STATEMENT OF INDUSTRIAL UTILITY

The method and system of the present invention may be useful for reducing energy consumption of refrigeration systems in commercial spaces such as supermarkets and the like.

What is claimed is:

1. A method for creating a humidity gradient within a single air conditioned zone by segregating said zone into a low humidity area and a high humidity area comprising the steps of:
   (a) withdrawing return air from the low humidity area;
   (b) withdrawing return air from the high humidity area;
   (c) passing said return air from said low humidity area through a dehumidification unit to obtain low humidity supply air;
   (d) passing said return air from said high humidity area through an air conditioning unit to obtain high humidity supply air;
   (e) separately injecting substantially all of said low humidity supply air into said low humidity area; and
   (f) separately injecting substantially all of said high humidity supply air into said high humidity area to effectively segregate said low humidity and high humidity areas thereby minimizing air flow between the high and low humidity areas.

2. The method of claim 1 wherein said air conditioned zone is the sales area of a supermarket.

3. The method of claim 2 wherein said low humidity area contains refrigeration cases.

4. The method of claim 2 wherein said high humidity area contains produce.

5. A method for creating a humidity gradient within a single air conditioned zone by segregating said zone into a low humidity area and a high humidity area, said high humidity area having a warm region and a cool region, comprising the steps of:
   (a) withdrawing return air from the low humidity area;
   (b) withdrawing return air from the high humidity area;
   (c) passing said return air from said low humidity area through a dehumidification unit to obtain low humidity supply air;
   (d) passing said return air from said high humidity area through an air conditioning unit to obtain high humidity supply air;
   (e) separately injecting substantially all of said low humidity supply air into said low humidity area;
   (f) separately injecting substantially all of said high humidity supply air into said high humidity area;
   (g) withdrawing ambient high humidity air from said cool region; and
   (h) separately injecting said ambient high humidity air into said warm region to effectively segregate said low humidity and high humidity areas thereby minimizing air flow between the high and low humidity areas.

6. The method of claim 5 wherein said air conditioned zone is the sales area of a supermarket.

7. The method of claim 6 wherein said warm region is the checkout area of said supermarket.

8. A method for creating a humidity gradient within a single air conditioned zone by segregating said zone into a low humidity area and a high humidity area comprising the steps of:
   (a) sensing a level of humidity within said low humidity area;
   (b) sensing a level of humidity within said high humidity area;
   (c) withdrawing return air from the low humidity area;
   (d) withdrawing return air from the high humidity area;
   (e) passing said return air from said low humidity area through a dehumidification unit to obtain low humidity supply air;

(f) passing said return air from said high humidity area through an air conditioning unit to obtain high humidity supply air;

(g) separately injecting substantially all of said low humidity supply air into said low humidity area in response to said sensed level of humidity being above a predetermined level of humidity; and (h) separately injecting substantially all of said high humidity supply air into said high humidity area to effectively segregate said low humidity and high humidity areas thereby minimizing air flow between the high and low humidity areas.

9. The method of claim 8 wherein said predetermined level of humidity is in the range of 30 to 45 percent relative humidity.

10. The method of claim 9 wherein a uniform temperature of the air is generally created within said low and high humidity areas.

11. The method of claim 8 wherein said air conditioned zone is defined at least by a ceiling and step (g) comprises injecting said low humidity supply air downwardly from said ceiling into said low humidity area in response to said sensed level of humidity being above a predetermined level of humidity.

12. A method for creating a humidity gradient within a single air conditioned zone by segregating said zone into a low humidity area and a high humidity area, said air conditioned zone being defined at least by a ceiling, comprising the steps of:

(a) withdrawing return air from the low humidity area;

(b) withdrawing return air from the high humidity area;

(c) passing said return air from said low humidity area through a dehumidification unit to obtain low humidity supply air;

(d) passing said return air from said high humidity area through an air conditioning unit to obtain high humidity supply air;

(e) separately injecting substantially all of said low humidity supply air downwardly from said ceiling into said low humidity area; and (f) separately injecting substantially all of said high humidity supply air into said air conditioned zone proximate said high humidity area to effectively segregate said low humidity and high humidity areas thereby minimizing air flow between the high and low humidity areas.

13. A method for creating a humidity gradient within a single air conditioned zone by segregating said zone into a low humidity area and a high humidity area comprising the steps of:

(a) withdrawing return air from the low humidity area;

(b) withdrawing return air from the high humidity area;

(c) passing said return air from said low humidity area through a dehumidification unit to obtain low humidity supply air;

(d) passing said return air from said high humidity area through an air conditioning unit to obtain high humidity supply air;

(e) separately injecting a desired portion of said low humidity supply air into said low humidity area to achieve a first temperature and first level of humidity in said low humidity area; and (f) separately injecting a desired portion of said high humidity supply air into said high humidity area to effectively segregate said low humidity and high humidity areas thereby minimizing air flow between the high and low humidity areas and to achieve a second temperature approximately equal to said first temperature in said high humidity area and to achieve a second level of humidity in said high humidity area such that a difference of at least 10% relative humidity exists between said low and high humidity areas.

14. A method for creating a humidity gradient within a grocery store having a single air conditioned zone by segregating said zone into a low humidity frozen food area and a high humidity produce area, comprising the steps of:

(a) withdrawing return air from the frozen food area;

(b) withdrawing return air from the produce area;

(c) passing said return air from said frozen food area through a dehumidification unit to obtain low humidity supply air;

(d) passing said return air from said produce area through an air conditioning unit to obtain high humidity supply air;

(e) separately injecting a desired portion of said low humidity supply air into said frozen food area to achieve a first temperature and first level of humidity in said frozen food area; and (f) separately injecting a desired portion of said high humidity supply air into said produce area to effectively segregate said frozen food and produce areas thereby minimizing air flow between the frozen food and produce areas and to achieve a second temperature in said produce area approximately equal to said first temperature and to achieve a second level of humidity in said produce area such that a difference of at least 10% relative humidity exists between said frozen food and produce areas.

15. A method for creating a humidity gradient within a single air conditioned zone by segregating said zone into a low humidity area having shopping aisles and a high humidity area, comprising the steps of:

(a) withdrawing return air from the low humidity area;

(b) withdrawing return air from the high humidity area;

(c) passing said return air from said low humidity area through a dehumidification unit to obtain low humidity supply air;

(d) passing said return air from said high humidity area through an air conditioning unit to obtain high humidity supply air;

(e) separately injecting substantially all of said low humidity supply air into the shopping aisles of said low humidity area; and (f) separately injecting substantially all of said high humidity supply air into said high humidity area to effectively segregate said low humidity and high humidity areas thereby minimizing air flow between the high and low humidity areas.

16. A method for creating a humidity gradient within a grocery store having a single air conditioned zone by segregating said zone into a low humidity frozen food area having shopping aisles and a high humidity produce area, comprising the steps of:

(a) withdrawing return air from the frozen food area;

(b) withdrawing return air from the produce area;

(c) passing said return air from said frozen food area through a dehumidification unit to obtain low humidity supply air;

(d) passing said return air from said produce area through an air conditioning unit to obtain high humidity supply air;

(e) separately injecting substantially all of said low humidity supply air into the shopping aisles of said frozen food area; and (f) separately injecting substantially all of said high humidity supply air into said produce area to effectively segregate said frozen food and produce areas thereby minimizing air flow between the frozen food and produce areas.

17. The method of claim 16 wherein in step (e) said low humidity supply air is injected into said shopping aisles of said frozen food area to achieve a first temperature and first level of humidity in the shopping aisles of said frozen food area and in step (f) said high humidity supply air is injected into said produce area to achieve a second temperature approximately equal to said first temperature in the produce area and to achieve a second level of humidity in the produce area such that a difference of at least 10% relative humidity exists between said frozen food and produce areas.

18. A method for controlling humidity within a single air conditioned zone of a grocery store by segregating the air conditioned zone into a low humidity area having a refrigeration case area for storing and displaying frozen food and a high humidity produce area for storing and displaying fruits and vegetables, said method comprising the steps of:

(a) withdrawing return air from the refrigeration case area;

(b) withdrawing return air from the produce area;

(c) passing return air from said refrigeration case area through a dehumidification unit to obtain relatively low humidity supply air;

(d) passing return air from said produce area through an air conditioning unit to obtain relatively high humidity supply air;

(e) separately injecting a desired portion of said low humidity supply air into said refrigeration case area to achieve a first level of humidity in said refrigeration case area; and (f) separately injecting a desired portion of said high humidity supply air into said produce area to effectively segregate said refrigeration case and produce areas thereby minimizing air flow between the refrigeration case and produce areas and to achieve a second level of humidity in said produce area, the first level of humidity being less than the second level of humidity such that the refrigeration cases in the refrigeration case area operate in a more energy efficient manner at the first level of humidity as compared to the second level of humidity and the fruits and vegetables experience less wilting at second level of humidity as compared to the first level of humidity.

* * * * *